F. D. STORY.
WAGON SPRING.
APPLICATION FILED OCT. 7, 1920.

1,398,810.

Patented Nov. 29, 1921.
3 SHEETS—SHEET 1.

INVENTOR.
F. D. STORY,
BY
Franklin N. Hough
ATTORNEY.

F. D. STORY.
WAGON SPRING.
APPLICATION FILED OCT. 7, 1920.
1,398,810.
Patented Nov. 29, 1921.
3 SHEETS—SHEET 2.
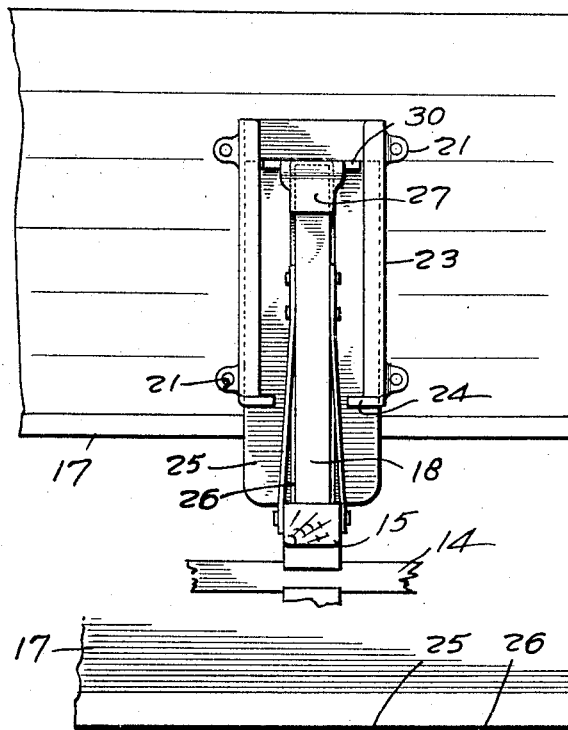
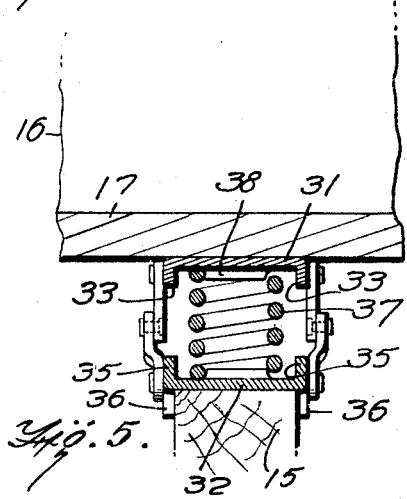
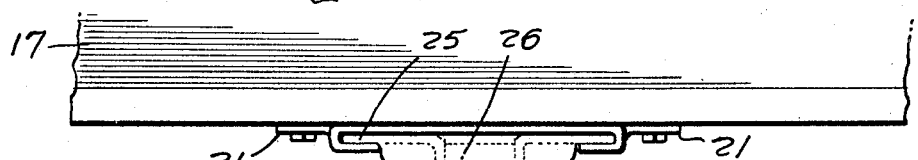
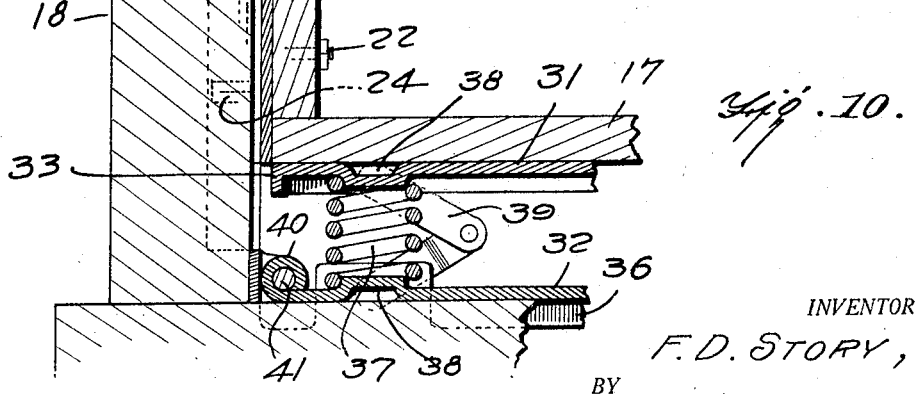
INVENTOR.
F. D. STORY,
BY
Franklin H. Hough
ATTORNEY.

F. D. STORY.
WAGON SPRING.
APPLICATION FILED OCT. 7, 1920.
1,398,810.
Patented Nov. 29, 1921.
3 SHEETS—SHEET 3.
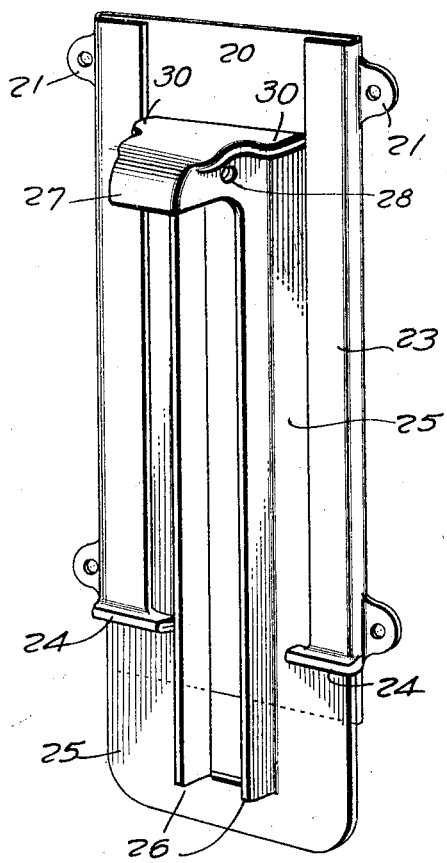
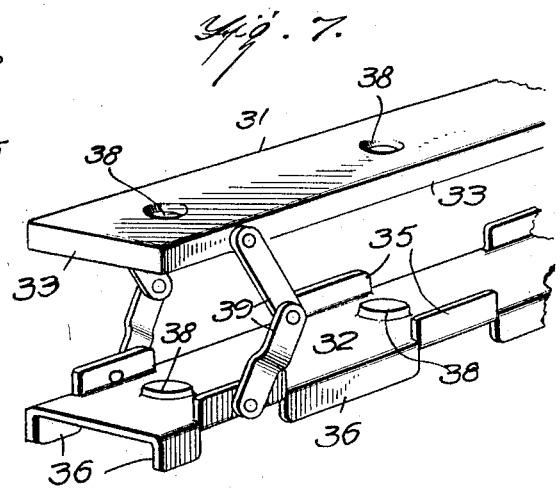
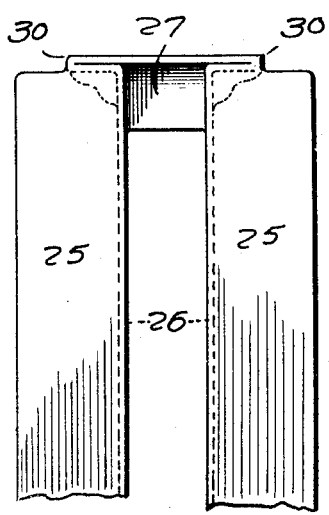
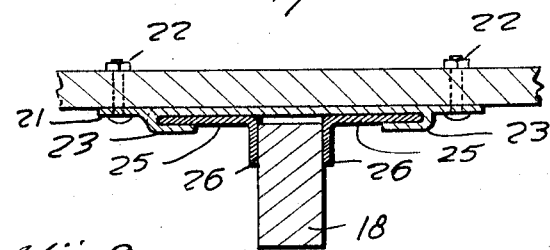
INVENTOR.
F. D. STORY,
BY
Franklin N. Hough
ATTORNEY.

UNITED STATES PATENT OFFICE.

FRED D. STORY, OF CENTER POINT, ARKANSAS.

WAGON-SPRING.

1,398,810.   Specification of Letters Patent.   Patented Nov. 29, 1921.

Application filed October 7, 1920. Serial No. 415,232.

*To all whom it may concern:*

Be it known that I, FRED D. STORY, a citizen of the United States, residing at Center Point, in the county of Howard and State of Arkansas, have invented certain new and useful Improvements in Wagon - Springs; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to the class of carriages and wagons, and more especially to supporting arrangements, or springs, as used in connection with wagons provided with bolsters for supporting the wagon box, body or bed, and between which and the bolsters there are interposed springs to absorb shocks and vibrations incident, especially, to the travel over rough and hilly roads, common in most rural districts.

Heretofore, wagon bodies have been so equipped that in traveling over hilly or rough roads or fields with the old style springs, the body would continually work up and down on the standards, and since no means was provided to protect the body sides, the latter were soon worn or cut through by the standards. Alleviation of this disadvantageous feature has been attempted by using metal plates on the sides of the body, but with the result that while protecting the body, the steel bands on the standards would be cut in two, thus requiring a new set of side planks, or a new set of standards in a very short time, and at considerable expense.

It is, therefore, the prime object of the present invention to eliminate the above difficulties and to provide for this purpose a novel and relatively simple construction of wagon body supporting spring-arrangement, which will give comparatively indefinite use, eliminating wear on and destruction of the body sides or standards, as well as preventing the body from jumping or slipping out of place, as often happened with the old style springs, with the disadvantages and dangers incident thereto, the displacement of the body often causing injury to the driver or horses, or causing runaways and damage.

A further object of the invention is to provide a spring arrangement and movable supporting means between the body and running gear, or bolsters thereof, which will also prevent the body from slipping forward, while permitting the same to freely move up and down to compensate for rough travel and protect fruits, vegetables and other perishable and breakable stuff, while also providing an arrangement which can be applied to old wagons with facility, as well as being equipped in the original instance.

The invention, therefore, further comprehends an improved slide, or movable connection between the body and the bolsters, which will permit free up and down movement of the body or wagon box, while also preventing displacement thereof from operative position, means being provided to limit the upward movement of the body, and the invention further embodying an improved and simple means for mounting and retaining the springs between the bottom of the wagon body and the bolsters, so as to allow convenient application of the improvement, in addition to providing a structure which can be economically manufactured and installed, and which will be strong, durable and not likely to get out of working order.

Referring now in detail to the drawings:

Fig. 3 is a fragmentary view in side elevation;

Fig. 4 is a fragmentary plan view;

Fig. 5 is an enlarged detail vertical sectional view taken on the line 5—5 of Fig. 1;

Fig. 6 is an enlarged perspective view of the slide arrangement between the body and bolsters of the running gear;

Fig. 7 is an enlarged fragmentary detail view in perspective of the spring retaining and supporting arrangement;

Fig. 8 is a horizontal cross sectional view taken on the line 8—8 of Fig. 2;

Fig. 9 is a fragmentary rear elevation of that part of the slide arrangement carried by a standard of the vehicle, and Fig. 10 is a view similar to Fig. 2, but showing a modified construction.

Figure 1:
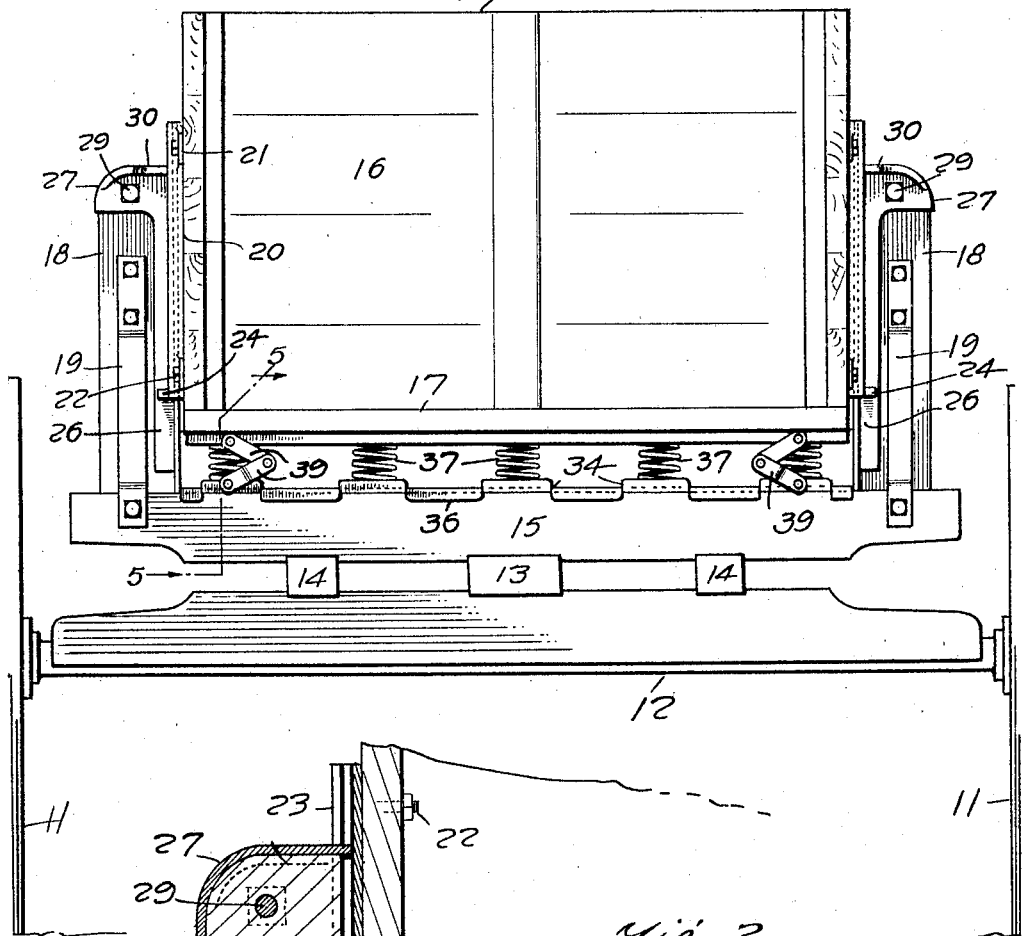
Figure 1 is an end elevation, showing a typical form of wagon having the improvement applied.
Figure 2:
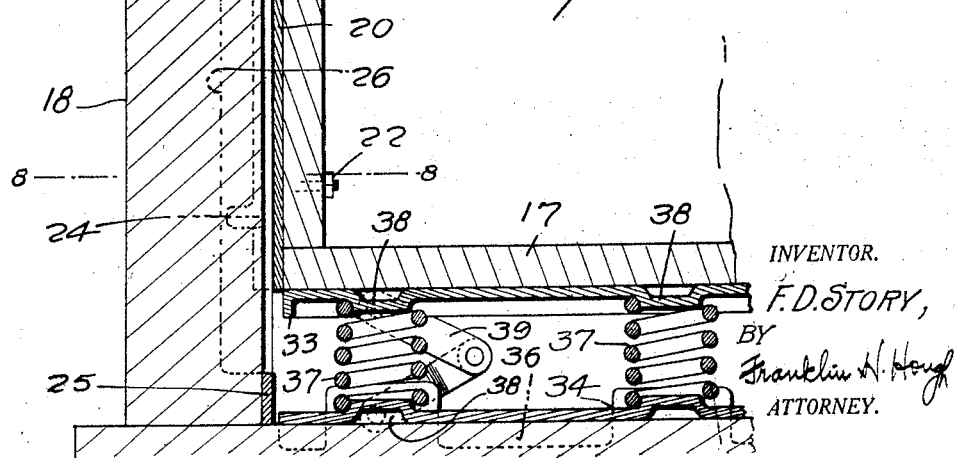
Fig. 2 is an enlarged fragmentary transverse vertical sectional view.

Referring to the drawings in detail, in which like reference characters designate corresponding parts throughout the several views, there is illustrated a typical form of "farm" wagon, of which the wheels 11 revolve on the axle 12 of the running gear, which includes also the reach bar 13 and hounds 14, upon which are arranged and supported the bolsters 15, running transversely and having the ends thereof projecting beyond the sides of the wagon body, or box, 16, of which 17 represents the bottom. The projecting ends of the bolsters 15 are provided with the standards 18, arranged upright perpendicularly thereto. The standards may be suitably secured to the bolsters, and are shown retained by braces 19, preferably arranged at both sides and bolted, or otherwise secured, to the standards and bolsters.

The foregoing constitutes no part of the improvement and may be altered or modified without departing from the invention being illustrated and described, to set forth an arrangement to which the improvements are applicable.

In carrying out the invention there is provided a slide arrangement between the standards and body, and as they are all the same, a description of one will suffice. To the sides of the body adjacent to each of the four standards is secured a metallic, or other, wear plate 20, vertically arranged and provided with opposed outwardly extending upper and lower apertured attaching ears 21, bolted, or otherwise securely attached, to the body sides, as at 22. The opposite vertical edges of the plate are provided with guideways produced by inwardly directed rims 23, having their lower ends rebent, or otherwise formed into flanges 24, arranged perpendicularly to the plate and projecting inwardly of the rims, the plate projecting below a short distance.

Fitted against the plate and movably engaging the guideways, is a plate 25, the opposite vertical edges of which movably fit the guideways 23. The plate 25 is provided intermediately with struck-up, or otherwise formed, spaced vertical flanges 26, engaging on opposite sides of the standard. The upper ends of the flanges 26, and plate 25, are formed into a socketed head 27, all of said parts being preferably of sheet metal, although it is to be understood that the same may be otherwise suitably formed in a manner best adapted in the art. The head 27 receives and conforms to the upper end of the standard, the flanges 26 being continued outwardly and provided with opposed alined apertures 28, registering with an opening through the standard, to receive a bolt 29 which secures the plate or slide 25 to the standard against movement. The lower end of the slide rests on the bolster. The head 27 is formed with laterally projecting shoulders 30, adapted, during the movements of the body and plates 20 therewith on the plates 25 carried by the standards, to limit such movement upwardly and forming stops to engage the abutments formed by the flanges 24, as it is thought will be obvious. In this manner, displacement of the body will be prevented and the slide arrangements will also preclude longitudinal, or forward, displacement of the body with the result heretofore alluded to.

The spring, or cushioning arrangement proper is provided over each bolster and consists of upper and lower plates 31 and 32, the former being provided with a downturned rim 33, surrounding the same and fitting, or being secured, against the bottom of the body transversely, as above specified. The lower plate is reposed, or secured, upon the bolster, and for this purpose, has its marginal longitudinal edges slit at spaced points transversely as at 34, the resultant tongues 35 and 36 being alternately bent up and down at right angles, so that the opposed portions are similarly bent and disposed in parallel relation. The tongues 36 fit against the opposite sides of the bolster to retain the plate 32 in position while the tongues 35 receive therebetween expansible helical springs, or other suitable form of cushioning elements 37, designed to absorb play and shocks and prevent transmission to the body contents in traveling over uneven road surfaces, especially stumps, logs or rocks.

Of course, the springs are arranged between the two plates 31 and 32 and sustain the body and load, the springs or cushions being of such strength as desired, or necessary. The plates just mentioned are further provided with means to retain the springs in position, in the form of cups, or depressions, 38 engaged by the springs, arranged as shown. In order to limit the relative movements of the plates, and thus the raising of the body so as to prevent displacement of the latter, articulated means in the form of pivotally connected links 39 is provided, said links in turn having their remote ends pivotally connected to the rim 33 and the outer flanges, or tongues, 35, thus limiting the relative movements of the plates, between the body and running gear, including the bolsters.

In the form of the device shown in Fig. 10 of the drawings, the lower end of the plate 25 and the outer end of the plate 32 are provided with coöperating pivot-ears, or sleeves, 40, forming a hinge joint, or pivotal connection, including the pintle 41. In this manner, the invention is adapted to the old style arrangement of springs, as well as the new style arrangement herein described.

In view of the foregoing, it is thought that the construction and operation of the device will be readily understood, and in view of the simplicity and practical value thereof, that it will readily commend itself to those skilled in the art.

Having thus particularly described the nature of my invention, what I claim to be new, and upon which I desire to secure Letters Patent is:

The combination with a wagon running gear comprising a bolster, standards spaced at the ends of the bolster and a body between the standards, of a cushioning member interposed between the body and the bolster, a wear member between the body and the standard and having means for removable rigid engagement with the standard, a wear plate rigidly secured to the body, tongue and groove connections between the wear member and the wear plate permitting sliding action therebetween, and means to prevent the separation of the wear member and the wear plate.

In testimony whereof I hereunto affix my signature.

FRED D. STORY.